United States Patent
Kay et al.

(10) Patent No.: US 8,566,901 B2
(45) Date of Patent: Oct. 22, 2013

(54) SETTING DEFAULT SECURITY FEATURES FOR USE WITH WEB APPLICATIONS AND EXTENSIONS

(75) Inventors: Erik Kay, Belmont, CA (US); Adam Barth, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/413,396

(22) Filed: Mar. 6, 2012

(65) Prior Publication Data

US 2013/0117807 A1    May 9, 2013

Related U.S. Application Data

(63) Continuation of application No. 13/284,469, filed on Oct. 28, 2011, now Pat. No. 8,181,254.

(51) Int. Cl.
*G06F 17/00* (2006.01)
*G06F 11/00* (2006.01)
*H04L 29/06* (2006.01)

(52) U.S. Cl.
USPC .................................. 726/1; 726/25; 713/168

(58) Field of Classification Search
USPC ........................................ 726/1, 25; 713/168
See application file for complete search history.

(56) References Cited

U.S. PATENT DOCUMENTS

| | | | |
|---|---|---|---|
| 7,360,082 B1 * | 4/2008 | Berthold et al. ............... | 713/157 |
| 7,748,609 B2 | 7/2010 | Sachdeva et al. | |
| 7,979,856 B2 | 7/2011 | Murray et al. | |
| 8,181,254 B1 | 5/2012 | Kay et al. | |
| 2003/0023953 A1 * | 1/2003 | Lucassen et al. .............. | 717/106 |
| 2003/0105959 A1 * | 6/2003 | Matyas et al. ................. | 713/168 |
| 2004/0179683 A1 * | 9/2004 | von Behren et al. ............ | 380/44 |
| 2005/0273759 A1 * | 12/2005 | Lucassen et al. .............. | 717/105 |
| 2006/0150256 A1 * | 7/2006 | Fanton et al. .................... | 726/27 |
| 2006/0218639 A1 * | 9/2006 | Newman et al. ................. | 726/25 |
| 2006/0235811 A1 * | 10/2006 | Fairweather .................... | 706/12 |
| 2007/0169199 A1 | 7/2007 | Quinnell et al. | |
| 2009/0055642 A1 | 2/2009 | Myers et al. | |
| 2011/0029772 A1 * | 2/2011 | Fanton et al. .................. | 713/165 |
| 2011/0113109 A1 * | 5/2011 | LeVasseur et al. ............ | 709/206 |
| 2011/0239270 A1 | 9/2011 | Sovio et al. | |
| 2011/0252475 A1 | 10/2011 | Mui et al. | |
| 2011/0295966 A1 | 12/2011 | Morris et al. | |
| 2011/0314389 A1 | 12/2011 | Meredith et al. | |
| 2012/0110318 A1 * | 5/2012 | Stone ............................ | 713/150 |
| 2012/0324568 A1 * | 12/2012 | Wyatt et al. ...................... | 726/13 |

OTHER PUBLICATIONS

Non-Final Office Action for U.S. Appl. No. 13/284,469, mailed Feb. 14, 2012, 15 pages.
Extended European Search Report for EP Application No. 12007288.9, mailed Apr. 8, 2013, 9 pages.

(Continued)

*Primary Examiner* — Techane Gergiso
(74) *Attorney, Agent, or Firm* — Brake Hughes Bellermann LLP

(57) ABSTRACT

According to one general aspect, a computer-implemented method for implementing default security features for web applications and browser extensions includes receiving a request to include a web application or a web browser extension in a digital marketplace. A determination is made if the web application or the web browser extension conforms to default security features, wherein the default security features include a prohibition against running in-line script on web pages. The web application or the browser extension is included in the digital marketplace if the web application or the browser extension conforms to the default security features.

16 Claims, 7 Drawing Sheets

(56) References Cited

OTHER PUBLICATIONS

Guarnieri, et al, "GATEKEEPER: Mostly Static Enforcement of Security and Reliability Policies for JavaScript Code", 18th USENIX Security Symposium, Aug. 2009, pp. 151-168.

Guha, et al, "Verified Security for Browser Extensions", 2011 IEEE Symposium on Security and Privacy, May 22, 2011, pp. 115-130.

Stamm, et al, "Reining in the Web with Content Security Policy", WWW 2010, Apr. 26-30, 2010, pp. 921-929.

"Google Chrome Extensions (Labs), Formats: Manifest Files", Google code labs, retrieved on Mar. 28, 2013 from http://web.archive.org/web/20111019061333/http://code.google.com/chrometextensions/manifest.html, Oct. 19, 2011, 5 pages.

* cited by examiner

SETTING DEFAULT SECURITY FEATURES FOR USE WITH WEB APPLICATIONS AND EXTENSIONS

RELATED APPLICATION

This application is a continuation of, and claims priority to, U.S. patent application Ser. No. 13/284,469, filed on Oct. 28, 2011, entitled "Setting Default Security Features of use with Web Applications and Extensions," which is hereby incorporated by reference in its entirety.

TECHNICAL FIELD

This disclosure generally relates to security for web applications, and more particularly to setting default security features for use with web applications and web browser extensions.

BACKGROUND

Traditionally, personal computing hardware and software systems followed a model where users explicitly made trust decisions about software installed and run on computer hardware. For instance, a user could install software by inserting a compact disk (CD) or other computer readable medium into his or her computer system. The user was responsible for the safety of the installed software, and for making decisions that the installed software did not contain malicious code, such as computer viruses, spyware, or other malicious software (malware).

This traditional trust model for software applications may not apply when software applications are delivered to computers via the Internet or the World Wide Web via, for example, a web browser. As an application platform, the modern web browser brings together a remarkable combination of resources, including seamless access to Internet resources, including access to a wide variety of application software. For example, web browser extensions and web applications may be written using the same standard web technology that developers use to create web pages. This is beneficial because it allows developers to create content without having to be concerned with compatibility with the entire World Wide Web, such as presentation differences between different types of web pages. Yet, this potentially means that a web application or browser extension is vulnerable to standard classes of bugs. For example, a developer can write code that tries to extract content from one web page and display the content in a browser extension page. If the developer writes that code improperly, the developer might give an author of a web page (i.e., the web page that they are getting data from) the ability to run code inside of the developer's extensions. This is sometimes called a cross-site scripting attack. With browser extensions, cross-site scripting attacks may prove especially dangerous because browser extensions may have more power than a normal web page does. If someone can get access into a browser extension, then they can do the things that an extension can do, potentially creating security problems.

SUMMARY

According to one general aspect, a computer-implemented method for implementing default security features for web applications and browser extensions includes receiving a request to include a web application or a web browser extension in a digital marketplace, determining if the web application or the web browser extension conforms to default security features, wherein the default security features include a prohibition against running in-line script on web pages, and including the web application or the browser extension in the digital marketplace if the web application or the browser extension conforms to the default security features.

In some implementations, the default security features may include a limit on an ability of the web application or the browser extension to run a predetermined JavaScript function. In some implementations, a developer may be allowed to override one of the default security features if the developer declares the override in the request. In some examples, a notification related to the override is displayed prior to allowing a user to download the web application or the browser extension from the digital marketplace. In some implementations, a developer may be allowed to override one of the default security features if the developer receives permission from a curator of the digital marketplace. In some examples, the override is labeled with a risk level, and the override and the label are stored in a database of a server. The default security features may apply to features of standard web technologies. Using a set of criteria, a request from the developer to override one of the default security features may be evaluated.

According to another general aspect, a computer-implemented method for notifying users of potential security issues for web applications includes presenting a representation of a web application in a digital marketplace, receiving a selection of the representation, and upon receiving the selection, displaying a notification about an override of a default security feature prior to allowing a user to download the web application from the digital marketplace, wherein the default security feature is a restriction against a predetermined JavaScript function.

In some implementations, a request from a developer to bypass the default security feature is evaluated using a set of criteria. In some implementations, an explicit declaration of the override may be received at a server from a developer of the web application. A set of default security features may be established, for example by a curator of a digital marketplace.

According to yet another general aspect, a tangible computer-readable storage medium has recorded and stored thereon instructions that, when executed by a processor of a computer system cause the computer system to: receive a request to include a web application or a browser extension in a digital marketplace, determine if the web application or the browser extension conforms to default security features, wherein the default security features include a prohibition against running in-line script on web pages, and include the web application or the browser extension in the digital marketplace if the web application or the browser extension conforms to the default security features.

In some implementations, the computer system may limit an ability of the web application or the browser extension to run a predetermined JavaScript function. In some implementations, the system may display a notification related to the override prior to allowing a user to download the web application or the browser extension from the digital marketplace. In some implementations, the system may allow the developer to override one of the default security features if the developer receives permission from a curator of the digital marketplace. In some implementations, the system may label the override with a risk level, and store the override and the label in a database of server. The system may evaluate a request from the developer to override one of the default security features.

According to yet another general aspect, a system includes a memory configured to store executable code, and a processor operably coupled to the memory, the processor configured to execute the code to: receive a request to include a web application or a browser extension in a digital marketplace, determine if the web application or the browser extension conforms to default security features, wherein the default security features include a prohibition against running in-line script on web pages, and include the web application or the browser extension in the digital marketplace if the web application or the browser extension conforms to the default security features.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
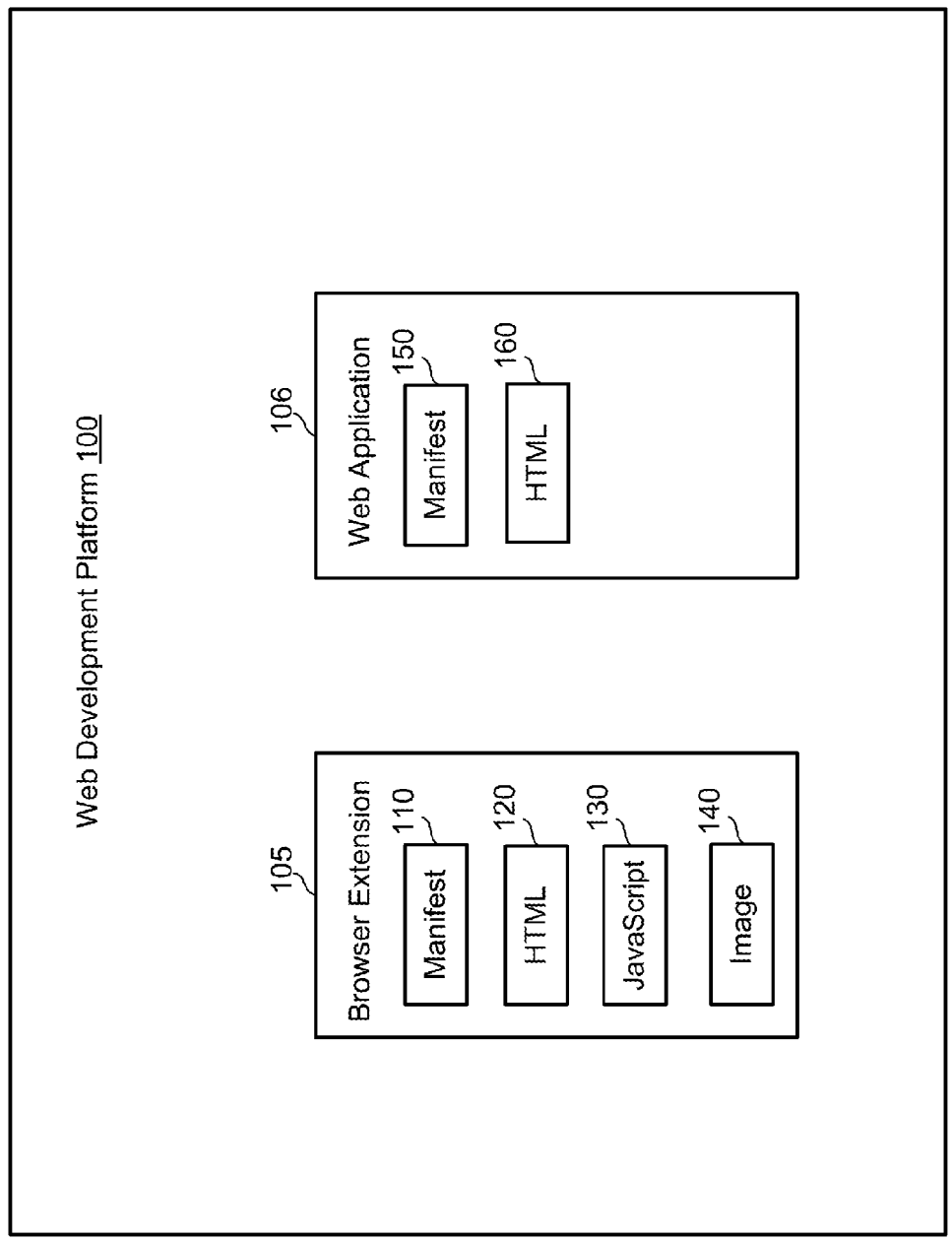
FIG. 1 illustrates an exemplary web development platform consistent with embodiments described in this disclosure.

A web browser executed by a client device can receive code (e.g., HTML code) from a remote server (e.g., a remote server that hosts a website) and can execute the received code on the client device for the benefit of a user of the client device.

In various implementations, the web browser may include or be associated with one or more web applications. In this context, a "web application" may be configured to perform a single task or multiple tasks for a user. In such an example, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various embodiments, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run standalone, like any regular website.

Browser extensions and web applications can be created for installation in and execution by a browser running on a client computing device. Developers may use a web development platform to develop and test browser extensions and applications, for example using HTML, CSS, Flash, JavaScript, or other standard web technologies. For example, browser extensions and web applications may include JavaScript functionality, such as eval( ) which evaluates or executes an argument, and innerHTML, which can change the contents of an HTML element.

Web Development Platform

FIG. 1 illustrates an exemplary web development platform consistent with embodiments described in this disclosure. Web development platform 100 includes browser extension 105 and web application 106. The web development platform 100 may be used to develop browser extension 105 and web application 106. Alternatively or additionally, users may upload browser extension 105 and web application 106 to test code, package the extension or application for distribution, and to validate security features.

Browser extension 105 includes a manifest file 110, HTML file 120, JavaScript file 130, and image file 140. Manifest file 110 may include information about extension 100, such as the most important files and the capabilities that extension 100 might use. HTML file 120 and JavaScript file 130 may include content for extension 105. This content may be limited by default security policies, such that certain JavaScript functions (e.g., eval( ) or properties (e.g., innerHTML) are not allowed for inclusion in extension 105 by default, for example because they create vulnerabilities for a user. Image file 140 may include an image used by extension 105. Extension 105 may include other files, or files may be deleted. For example, image file 140 or HTML file 120 may be deleted, or other image files may be included in extension 105.

Web application 106 may be a packaged application, which includes a manifest file 150 that may include permissions (e.g., permissions to use local resources or do other things normal HTML code is not permitted to do) and at least one HTML file 160 to provide a user interface. The depiction and configuration of web application 106 is merely for illustration, and web application 106 may also include other files.

Browser extension 105 and web application 106 may be packaged for distribution or sale in a digital marketplace, as discussed in more detail below with respect to FIG. 4. As discussed above, a digital marketplace may require certain security features, for example using a content security policy ("CSP"). The security features within an application or extension may be implemented and tested to determine if they conform with a CSP, for example prior to packaging the applications and extensions for sale. Testing may be performed using web development platform 100. In one example, web development platform 100 may determine whether or not web application 106 conforms to default security features. If web application 106 does not conform, web development platform 100 may prevent a developer from packaging web application 106 for sale in a digital marketplace.

Any number of security features may be required. Yet, security features that make sense for normal web pages are often a bad match for web applications. For example, normal web pages must ask for permission from the user before they can do relatively innocuous things like show desktop notifications, use the clipboard, or access permanent storage. This makes sense because it would be annoying for random web pages to show desktop notifications. In contrast, if a web application repeatedly asks for permission, it creates a terrible user experience. One approach to improve a user experience is for users to install their favorite web applications. An installed web application can have a more prominent place in a browser and be granted increased permissions compared to web pages. Yet, problems may occur if after download, a user experiences security issues due to vulnerabilities created exposed by a downloaded web application (or browser extension). For example, a user may not want a random web page to have access to a web camera or to personal data such as a geo-location, or to determine an idle state of a user.

Further, web applications and browser extensions may be vulnerable to security problems. For example, if the web applications and browser extensions were not developed with sufficient safeguards, they may be vulnerable to a cross-site scripting attack. Another potential security problem is when retrieving HTTP content on an HTTPS page, the HTTP content might have been corrupted by a network "man-in-the-middle" if a user is on a hostile network.

To help prevent these security problems, web development platform 100 may require default security features, such as security features that are particular to web applications and browser extensions. For example, web development platform 100 may restrict or disable a developer's ability to have inline script on web pages. In that example, a script source would have to load from a file rather than having inline script with HTML. One benefit provided by disabling inline script on web pages is that if somebody does manage to get an access to a web page, they cannot actually use it to write code on the web page. Other examples of security features include limits on JavaScript functionality that are particularly likely to be the source of bugs (e.g., eval( ) or innerHTML).

Developer User Interface

Figure 2:
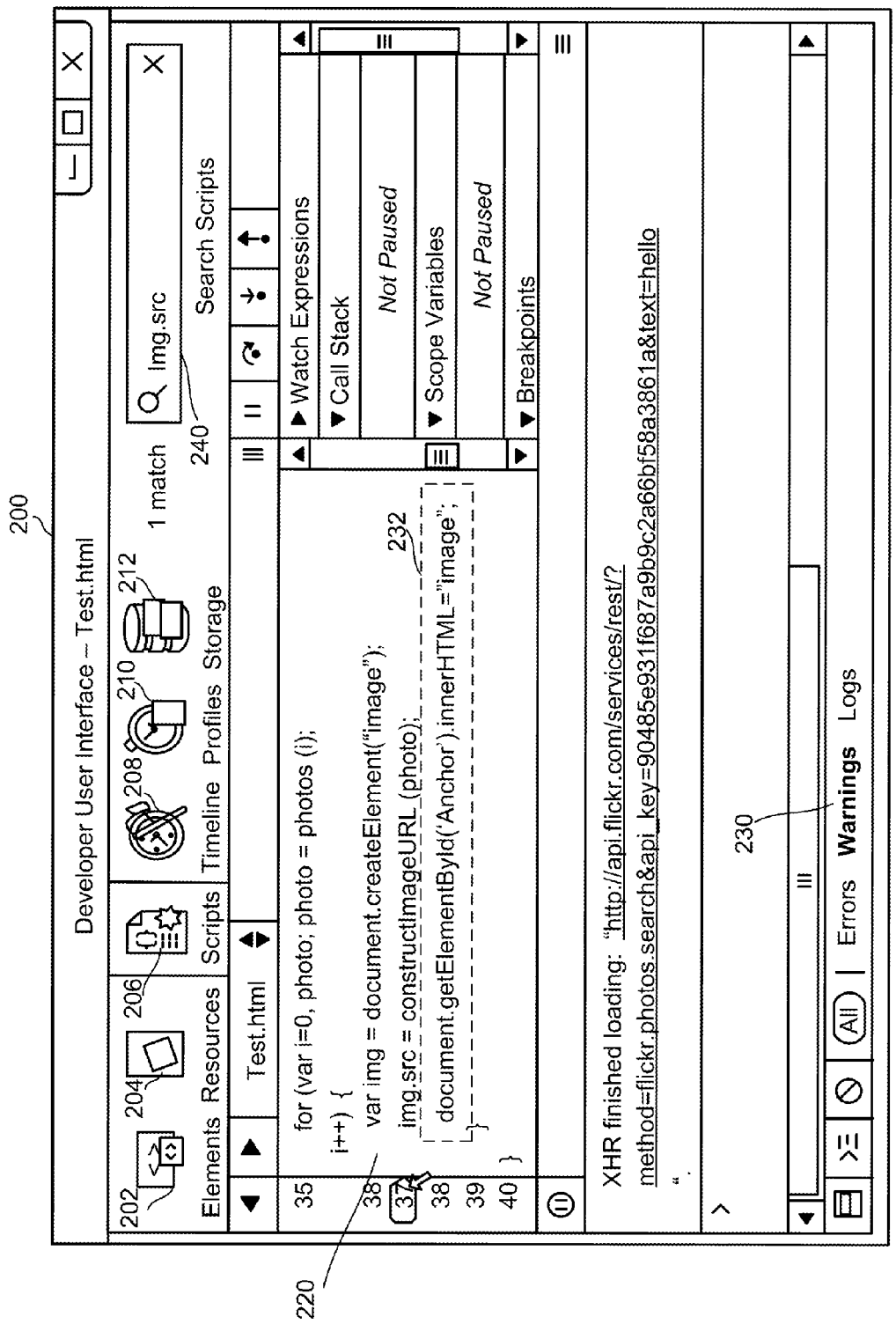
FIG. 2 is illustrates an exemplary developer user interface for a web development platform.

A web development platform, such as web development platform 100 shown in FIG. 1, may allow web developers and programmers access into the internals of the browser and their web application. FIG. 2 illustrates an exemplary developer user interface 200 for a web development platform. Developer user interface 200 may be accessed by opening a web page and selecting a menu icon, for example, or by using a keyboard shortcut.

As shown in FIG. 2, in some implementations, developer tools may be organized into task-oriented groups that are represented by icons in a toolbar 201 at the top of developer user interface 200. Each toolbar item and corresponding panel may let a user work with a specific type of page, browser extension, or web application information, including Document Object Model (DOM) elements, resources, and scripts. Toolbar 201 also provides a search field 240 that enables a user search the current panel.

Toolbar 201 may include various icons, which, upon selection, may change the panel displayed in window 230. For example, developer user interface may include an elements icon 202, a resources icon 204, a scripts icon 206, a timeline icon 208, a profiles icon 210, and a storage icon 212. In some implementations, developer user interface 200 may include other icons, such as an audits icon (not shown) that may offer suggestions for decreasing page load time.

Elements icon 202 may allow a user to see a web page as a browser sees it. Using the elements icon 202, a user can see raw HTML, raw CSS styles, a DOM, and can manipulate elements in real time, for example within window 220. Resources icon 204 allows a user to inspect resources that are loaded or available to an inspected page. Resources icon 204 allows a user to interact with frame trees containing frame resources (such as HTML, JavaScript, CSS, Images, Fonts, etc.), HTML5 Databases, Local Storage, Cookies, and App-Cache.

As shown in FIG. 2, scripts icon 206 may allow a user to view JavaScript or HTML code for a page in window 220, along with a script debugger. As shown, code for "Test.html" is currently displayed in window 220.

Timeline icon 208 allows in-depth visibility into various behind-the-scenes activities, such as how long a browser takes to handle DOM events, render page layouts, and paint a window. Profiles icon 210 allows a user to capture and analyze the performance of JavaScript scripts. For example, upon selecting profiles icon 210, a user can learn which functions take the most time to execute.

Developer user interface 200 may display a warning if a default security feature is violated. For example, if a developer of a browser extension has included the innerHTML function in an HTML file, developer user interface 200 may display warning 230. Warning 230 may be selectable and may display additional details related to a violation of a default security feature (e.g., the innerHTML function). In some implementations, if a default security feature is violated, a line of code may be highlighted, may flash or change colors, or be otherwise marked or indicated, for example as shown by box 232 in window 220, which indicates that "document.getElementById('Anchor').innerHTML='image'", which is part of "Test.html", may violate a default security feature. If a user removes the offending line of code or otherwise changes an offending function, user interface 200 may remove warning 230.

Bypass Default Security Features

In some implementations, developers may bypass or override default security features. For example, a developer may explicitly declare or request that he wants to override a default security feature via developer user interface 200. The request may be made simultaneously with or subsequent to a request to include a web application or browser extension in a digital marketplace, for example. The request may be evaluated, for example automatically at a server using a set of criteria (e.g., criteria such as the type of web application or browser extension, developer credentials, or a developer status) or manually by an administrator such as a curator of a digital market place. The request may be granted or denied. If the request is granted, the override may be labeled, for example with a risk level (e.g., "High Risk"), and stored in a database, for example in a database of a server. In some implementations, each request for an override may be stored.

In some implementations, developers whose web applications or browser extensions are reported to cause security issues may have their requests for overrides analyzed in more detail than other developers whose web applications or browser extensions are trusted or have better reports on security performance. In some implementations, web applications or browser extensions may be removed from a digital marketplace if security issues are reported by users. In some implementations, developers of web applications or browser extensions with multiple security issues may be denied future permission for overrides, or may even be denied permission to distribute web applications or browser extensions. Additionally, enterprise policies may be implemented to prevent users from installing applications or extensions that may do dangerous things (e.g., extensions that violate default security features).

Figure 3:
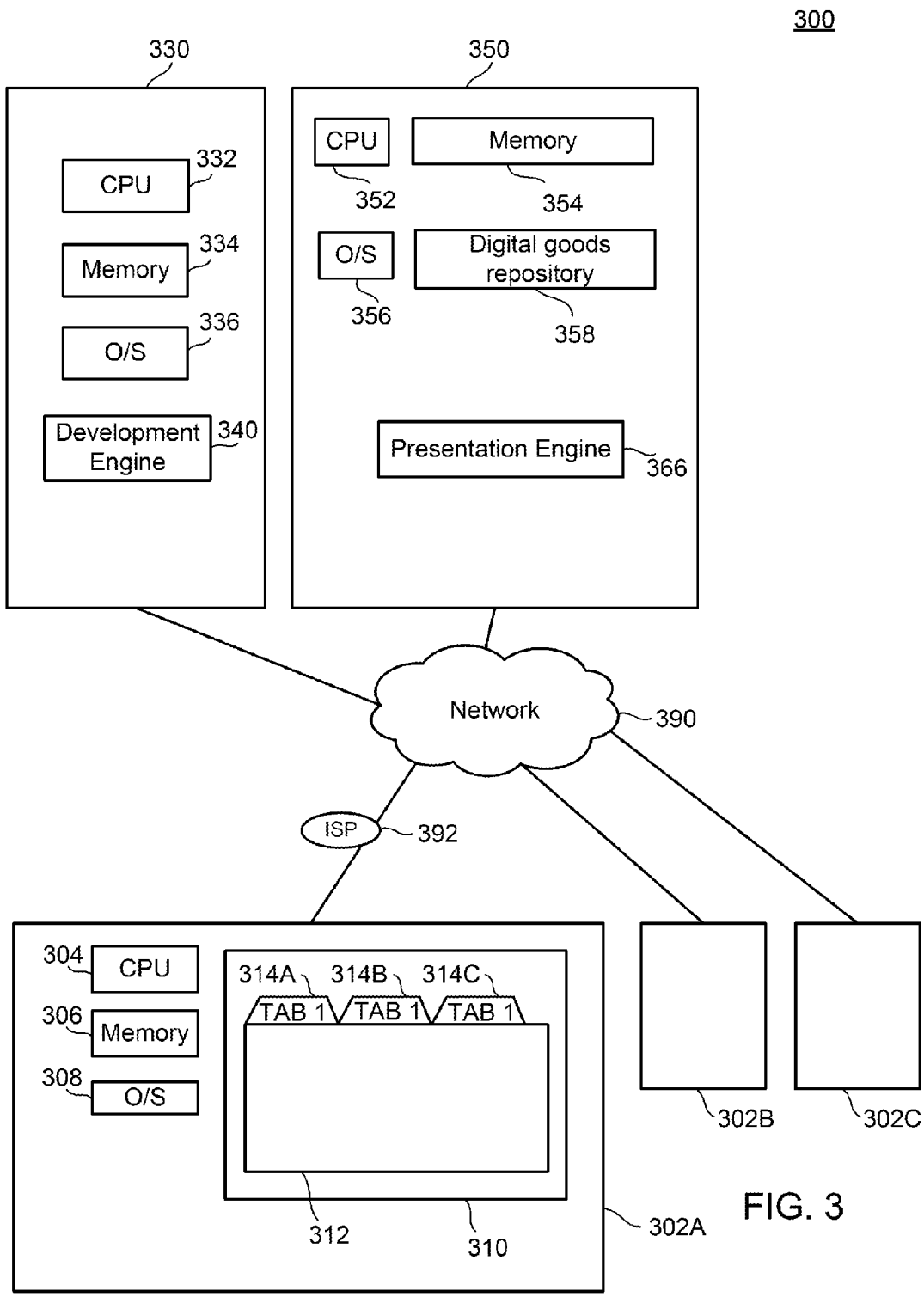
FIG. 3 is a schematic block diagram of an example embodiment of a system for setting default security features for web applications and web browser extensions.

FIG. 3 is a schematic block diagram of an example embodiment of a system 300 for setting default security features for web applications and web browser extensions. In various embodiments, system 300 may include client computing devices (e.g., desktop computers, notebook computers, netbook computers, tablet computers, smart-phones, etc.) 302A, 302B, and 302C. A client computing device 302A may include one or more processors 304 and one or more memories 306. The client computing device 302A may execute an operating system 308 and an application 310, which may display a user interface window 312. The client computing device 302A may include a location detector 316, which may automatically detect a location of the computing device, for example, based on global positioning system (GPS) signals, or by triangulation of signals from transmitters at known locations, or by using other hardware or techniques.

In one example, client computing device 302A may be running or causing the operating system 308 to execute an application 310 or window 312. For purposes of illustration, window 312 is referred to as a web browser. However, it is understood that the above is merely one illustrative example to which the disclosed subject matter is not limited. In various implementations, window 312 may include a plurality of panes or tabs 314A, 314B, 314C. Window 312 may be a visual area containing some kind of user interface. In a graphical user interface (GUI) used in client device 302A, window 312 may be a two-dimensional object arranged on a plane of the GUI known as the desktop. Window 312 may include other graphical objects, e.g., a menu-bar, toolbar(s), controls, icons and a working area in which a document, image, folder contents, or other main object may be displayed. The working area may be capable of holding only one main object (i.e., in a single document interface) or more than one main object in a multiple document interface. In some applications, such as web browsers, multiple documents may be displayed in individual tabs 314A, 314B, 314C. These tabs 314A, 314B, 314C may be displayed one at a time, and may be selectable via a tab-bar which may reside above the contents of an individual window. That is, one selected tab 314A is "forward-facing" and displays information or content to a user in the window 312, while the content of other tabs 314B and 314C is "hidden."

The client computing devices 302A, 302B, and 302C may receive online content from one or more server computing devices 330, 350, which may be connected to the client device 302 through a network 390. Each of the client computing devices 302A, 302B, and 302C may be connected to the network 390 through a local Internet Service Provider 392. The received online content may be processed and displayed in the window 312 (e.g., in tab 314 of window 312). For example, window 312 may display web development platform 100, or window 302 may display a user interface of a marketplace for digital goods.

A location of client computing device 302A may be determined based on a location associated with the ISP 392. For example, a known location of ISP 392 may be used as an approximation or as a proxy for the location of the client computing device 302A.

Client computing device 302A may communicate with a digital goods marketplace server 350 that provides a marketplace for digital goods to client computing devices 302A, 302B, 302C. The marketplace server 350 may include one or more processors 352 and one or more memories 354. The marketplace server 350 may execute an operating system (O/S) 356 and various applications and services to provide functionality to the client computing devices. For example, in one implementation, the marketplace server 350 may include a digital goods repository 358 (e.g., a database or other data store), and the digital goods may be served from, or downloaded from, the repository to the client computing devices. In another implementation, the digital goods and related data may be stored in, and serve to client computing devices from, a repository that is remotely located from the marketplace server. For example, digital goods could be stored and served to client computing devices from individual repositories that are operated and controlled by developers of the digital goods, and digital goods repository 358 of the marketplace server 350 may provide a reference to the individual repositories that are operated by the developers.

Digital goods repository 358 stores metadata associated with the digital goods that are available from or referenced by the digital goods repository 358. The metadata associated with a digital good may include a variety of information about the digital goods including, for example, information about the digital goods that are available from the repository 358. Such information may include, for example, representative keywords associated with the digital goods, and the price associated with the digital goods. The metadata may also include demographic data about targeted users of the digital good, a time of year month or day during which the digital goods may be of the highest interest to a user, etc. For example, metadata associated with a surfing videogame may indicate that the good is intended for use by male users between the ages of 15 and 34, who live in coastal California or Hawaii, and that the game may be more popular during summer months than during winter months.

The marketplace server 350 may include a presentation engine 366 that prepares information for transmission to the client computing devices 302A, 302B, 302C, where the information is used by the client computing devices to display a user interface 100 that shows representations of selected digital goods available in the marketplace.

The information that is provided by a client device to the marketplace server 350 (e.g., files for browser extensions or web applications, override requests, etc.) may be provided on an opt-in basis. In other words, such information may be provided from the client computing device 302A to the server 350 only if the user of the client device specifically authorizes the transmission of such information from the client to the server. Further, in some implementations, security-related information may be reported to clients that have opted to receive such information, such as to a user who opted to receive security notifications when the user downloaded an application. In addition, data may be anonymized in one or more ways before it is sent, so that personally identifiable information is removed.

Because browser application 310 may communicate easily over network 390, the browser application may provide feedback to marketplace server 350 about the local usage of the web application on the client computing device. By receiving such feedback from many client computing devices 302A, 302B, 302C, marketplace server 350 may gather a great deal of information about how an application is actually used and about any security issues a user encounters after the application is downloaded from the marketplace server 350. Thus, marketplace server 350 may analyze digital goods based on signals related to security issues, where such signals may include signals based on information about how applications actually perform after the applications are downloaded from the marketplace server 350 and installed on a client computing device.

The above-described signals are but a few examples of signals based on information that is generated outside of the marketplace and relevant to the performance or security issues of different applications that are available from the marketplace. For example, users may report malware or bugs to marketplace server 350.

As shown in FIG. 3, system 300 may include a development server 330 that includes one or more processors 332, one or more memories 334, an operating system 336, and a development engine 340. Development engine 340 may receive and process one or more files relating to web applications or browser extensions from client computing devices 302A, 302B, 302C, and may provide web development platform 100. For example, development engine 340 may receive manifest file 110, HTML file 120, JavaScript file 130, and image file 140 as shown in FIG. 1.

Development server 330 may monitor and test web applications or browser extensions (e.g., browser extension 105 and web application 106 shown in FIG. 1) using security features. A set of security features (e.g., a CSP) may be stored in development server 330, for example in memory 334, or may be stored remotely and accessed by development engine 340. The set of security features may be a default list of features, which may be editable by administrators who have permission to edit or modify the security features and other aspects of development engine 340. For example, administrators may add JavaScript functions to a default security feature list.

Information (e.g., web application or browser extension files, images, etc.) provided by a client device to the marketplace server 350 may be provided on an opt-in basis. In other words, such information may be provided from the client computing device 302A to the server 350 only if the user of the client device specifically authorizes the transmission of such information from the client to the server.

Digital Marketplace User Interface

Figure 4:
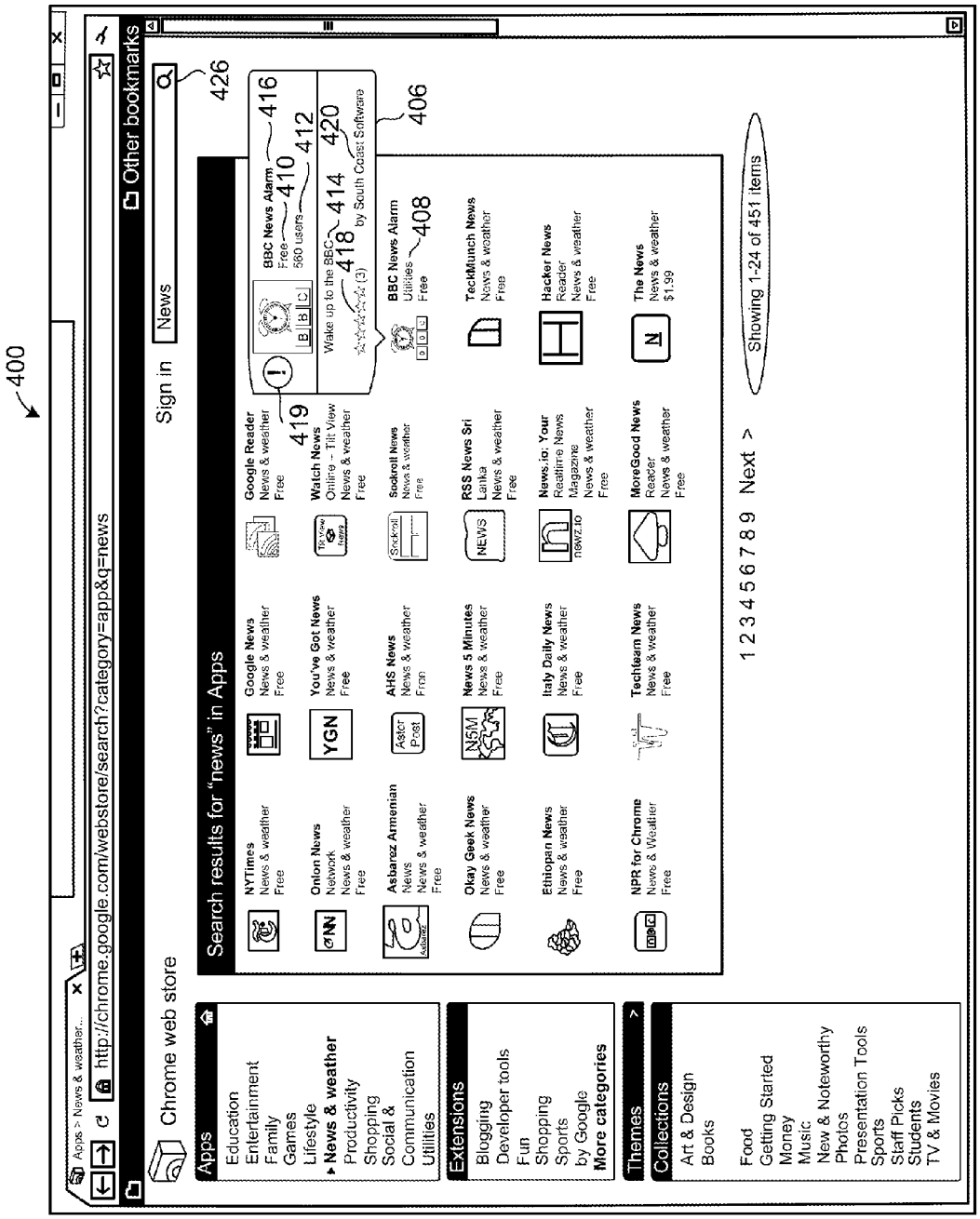
FIG. 4 illustrates a user interface for a web browser.

FIG. 4 illustrates a user interface 400 for a marketplace of digital goods. The user interface is an example of a screen that may be displayed when a user enters a query term "news" in query box 426 to search for web applications available in the marketplace that are related to news. The query term may be compared to metadata associated with digital goods, for example, data stored in digital goods repository 358. Based on the comparison, a query handler may identify one or more digital goods that are related to the query term. The applications that are selected for display in the user interface may be selected based on a ranking of the relative desirability of the identified applications. Furthermore, among the selected subset of applications, the position of the applications within the user interface 400 may be determined by their ranking For example, applications with higher rankings may be displayed in rows at the top of the user interface 400, and, within a row, applications with a higher ranking may be displayed on the left side of the row.

A pop-up HTML window 406 may be displayed when a user moves a mouse icon over an icon for an application 408 that is displayed in the user interface 400. Within the pop-up HTML window 406, additional information about the web application 408 may be displayed. For example, a field 410 may indicate whether the application is free or the price that must be paid to be able to download and install the app. Another field 412 may indicate how many users have downloaded and/or installed and/or used the application. Information about the installation and/or use of the application on a client device may be transmitted from a browser executing the application of the client device to the marketplace server 350. Another field 414 may display descriptive information about the web application that supplements information in the title field 416. Another field 418 may display an average subjective rating that users have provided of the web application and a number of users that have rated the application.

Another field 419 may display an indicator reflecting a warning, such as a warning that a default security feature has been overridden by a developer. For example, if the developer of application 406 requested permission to include the JavaScript eval( ) function in the code for application 406, field 419 may reflect that there are potential security issues with application 406. Additional information, such as a written warning explaining which default security features were overridden, may also be displayed, for example in a pop-up window. Another field 420 may display the name of the author or developer of the application.

Figure 5:
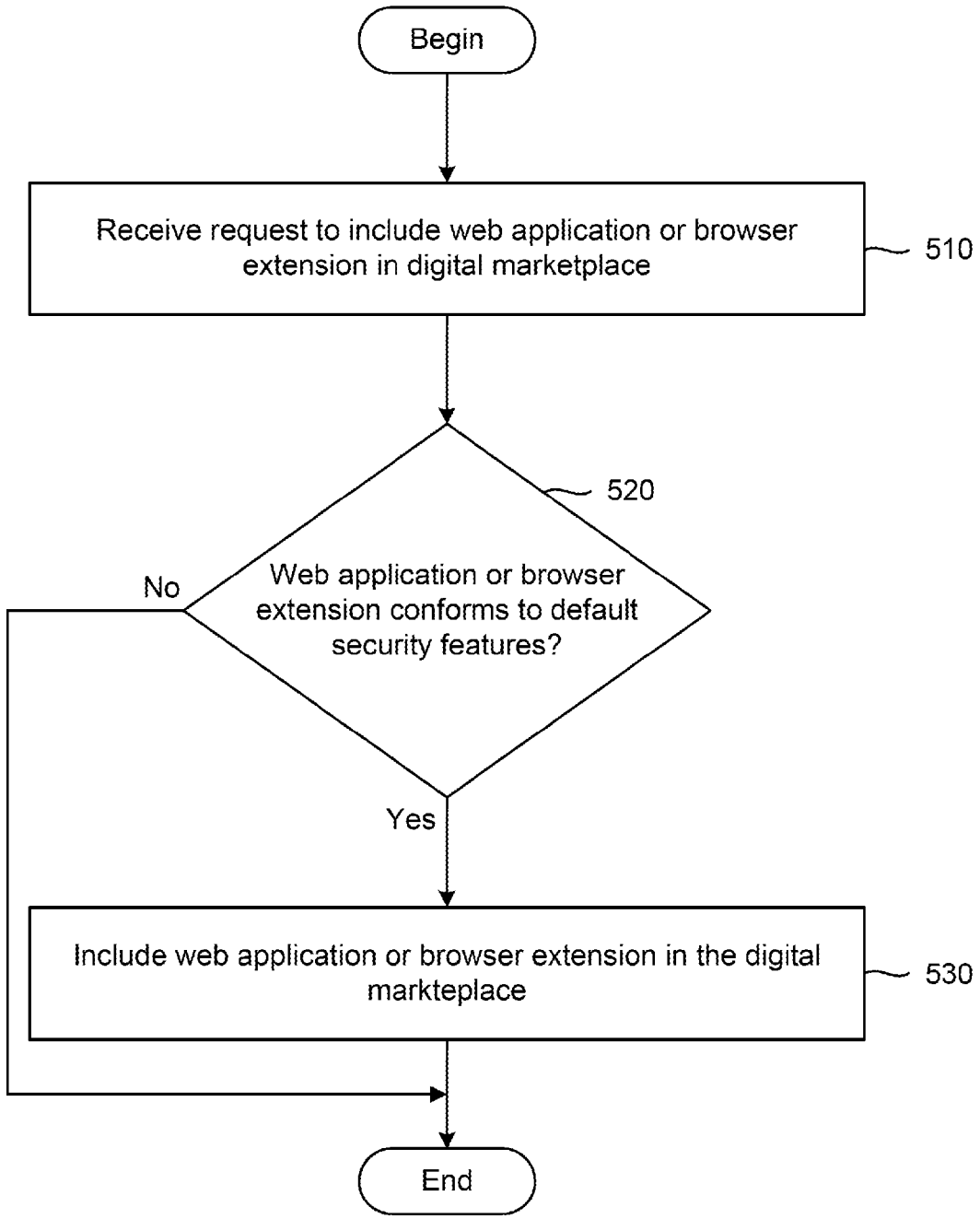
FIG. 5 illustrates a flowchart of an exemplary process for implementing default security features for web applications and browser extensions.

FIG. 5 is a flowchart of a process for implementing default security features for web applications and browser extensions. The flowchart shown in FIG. 5 may be performed at least in part by a development server or a marketplace server (e.g., the servers 330, 350 shown in FIG. 3). As shown in FIG. 5, a request to include a web application or a web browser extension in a digital marketplace is received (step 510), for example by server 330. A determination is made if the web application or the web browser extension conforms to default security features (step 520). For example, the default security features include a prohibition against running in-line script on web pages. The web application or the browser extension are included in the digital marketplace (e.g., as shown in FIG. 4) if the web application or the browser extension conforms to the default security features (step 530, yes). The process shown in FIG. 5 is an example of one implementation, and may have steps deleted, reordered, or modified.

Figure 6:
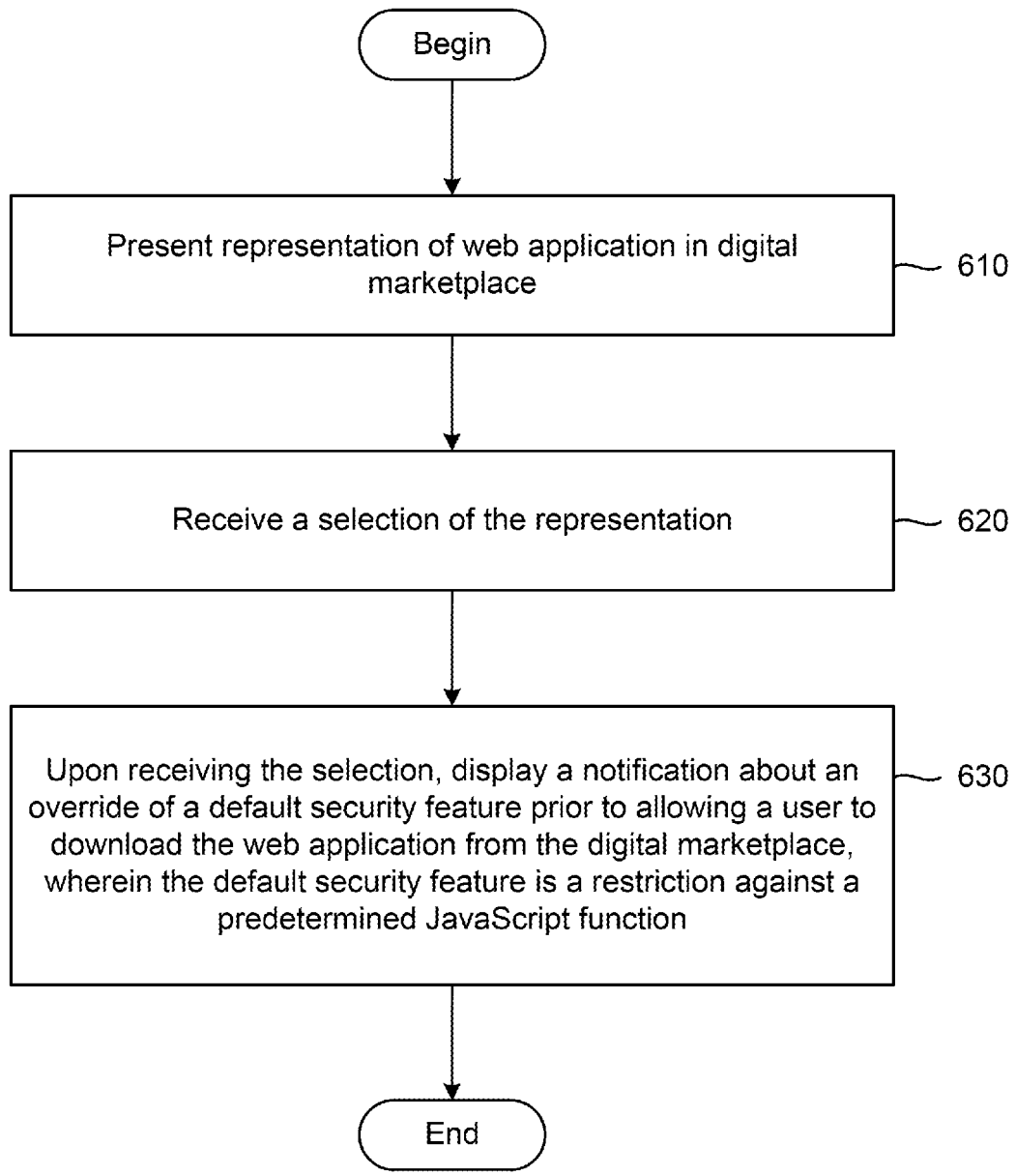
FIG. 6 is a flowchart of an exemplary process for allowing override of default security features.

FIG. 6 is a flowchart of a process for notifying users of potential security issues for web applications. The flowchart shown in FIG. 6 may be performed at least in part by a marketplace server (e.g., server 350 shown in FIG. 3). A representation of web application is presented in a digital marketplace (step 610), such as the digital marketplace shown in FIG. 4. A selection of the representation is received (step 620), and upon receiving the selection, a notification about an override of a default security feature is displayed prior to allowing a user to download the web application from the digital marketplace, wherein the default security feature is a restriction against a predetermined JavaScript function (step 630).

Figure 7:
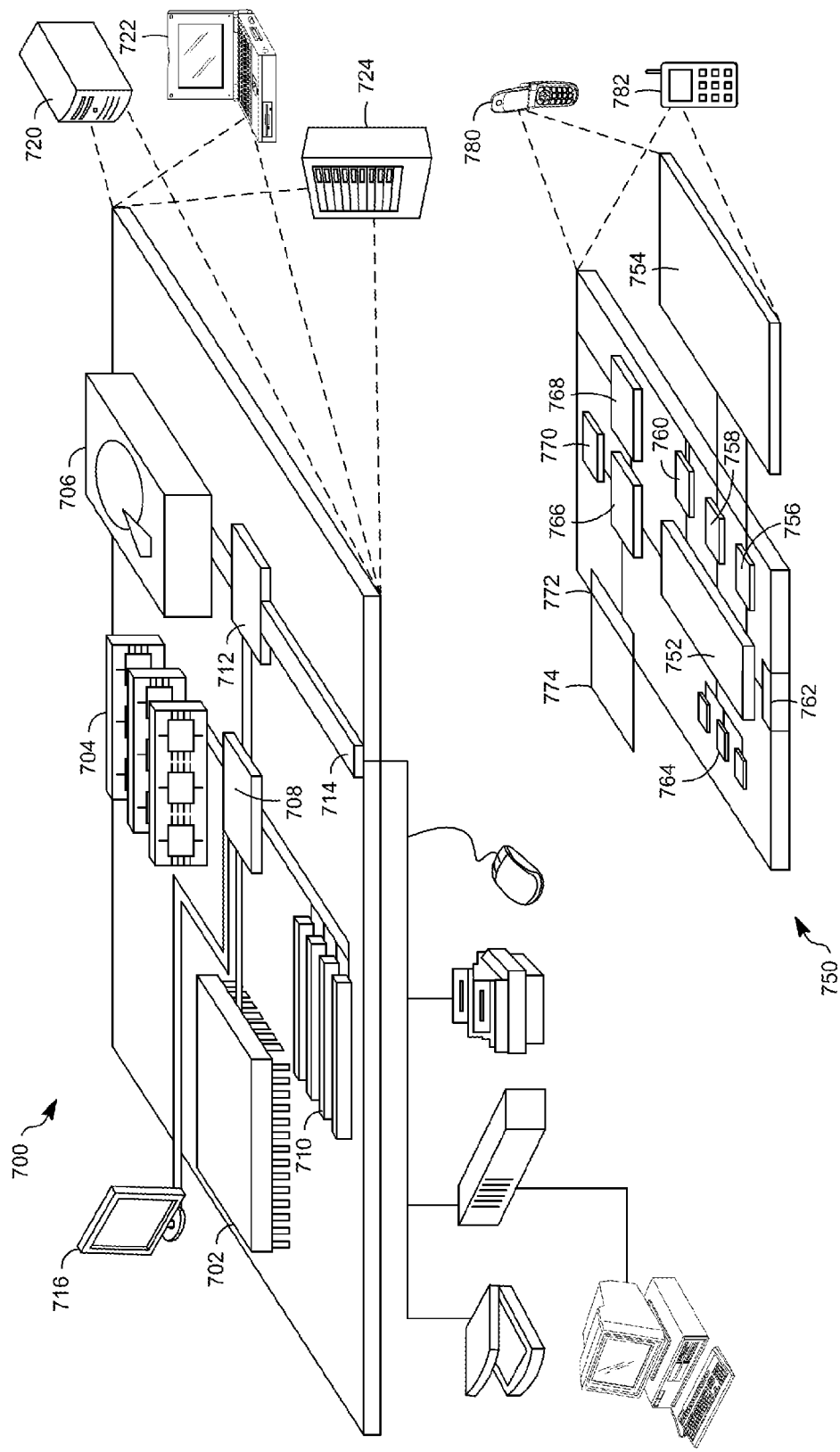
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for implementing default security features for applications, comprising:
   receiving a request from a developer of a plurality of developers to include a web application or a browser extension in a digital marketplace, wherein the web application or the browser extension is packaged in a format for distribution via the digital marketplace;
   determining if the web application or the browser extension conforms to default security features;
   allowing the developer to override one of the default security features if the developer declares the override in the request and if the developer receives permission from a curator of the digital marketplace;
   labeling the override with a risk level;
   storing the override and the label in a database of a server;

including the web application or the browser extension in the digital marketplace if the web application or the browser extension conforms to the default security features; and displaying a notification related to the override prior to allowing a user to download the web application or the browser extension from the digital marketplace.

2. The computer-implemented method of claim 1, wherein the default security features include a prohibition against running in-line script on web pages.

3. The computer-implemented method of claim 1, wherein the default security features include a limit on an ability of the web application or the browser extension to run a predetermined JavaScript function.

4. The computer-implemented method of claim 1, wherein the default security features apply to features of standard web technologies.

5. The computer-implemented method of claim 1, further comprising:
evaluating, using a set of criteria, a request from the developer to override one of the default security features.

6. The method of claim 1, wherein the default security feature is a restriction against a predetermined JavaScript function.

7. The computer-implemented method of claim 1, further comprising:
evaluating, using a set of criteria, a request from a developer to bypass the default security feature.

8. The computer-implemented method of claim 1, further comprising:
receiving, at the server, an explicit declaration of the override from the developer of the web application or the browser extension.

9. The computer-implemented method of claim 1, wherein the web application is a packaged web application that may be executed locally on a computing device without access to a network.

10. A non-transitory computer-readable storage medium having recorded and stored thereon instructions that, when executed by a processor of a computer system cause the computer system to:
receive a request, from a developer of a plurality of developers to include a web application or a browser extension in a digital marketplace, wherein the web application or the browser extension is packaged in a format for distribution via the digital marketplace;
determine if the web application or the browser extension conforms to default security features;
allow the developers to override one of the default security features if the developer declares the override in the request and if the developer receives permission from a curator of the digital marketplace;
label the override with a risk level;
store the override and the label in a database of server;
include the web application or the browser extension in the digital marketplace if the web application or the browser extension conforms to the default security features; and
display a notification related to the override prior to allowing user to download the web application or the browser extension from the digital marketplace.

11. The non-transitory computer-readable storage medium of claim 10, further comprising instructions that, when executed by a processor of a computer system cause the computer system to:
limit an ability of the web application or the browser extension to run a predetermined JavaScript function.

12. The non-transitory computer-readable storage medium of claim 10, further comprising instructions that, when executed by a processor of a computer system cause the computer system to:
evaluate the request from the developer to override one of the default security features.

13. A system comprising:
a memory configured to store executable code; and
a processing device operably coupled to the memory, the processor configured to execute the code to:
receive a request, from a developer of a plurality of developers, to include a web application or a browser extension in a digital marketplace, wherein the web application or the browser extension is packaged in a format for distribution via the digital marketplace;
determine if the web application or the browser extension conforms to default security features;
allow an override of one of the default security features if the override is declared in the request and if the developer receives permission from a curator of the digital marketplace;
label the override with a risk level;
store the override and the label in a database of a server;
include the web application or the browser extension in the digital marketplace if the web application or the browser extension conforms to the default security features; and
display a notification related to the override prior to allowing a user to download the web application or the browser extension from the digital marketplace.

14. The system of claim 13, wherein the default security features include a prohibition against running in-line script on web pages.

15. The system of claim 13, wherein the default security features include a limit on an ability of the web application or the browser extension to run a predetermined JavaScript function.

16. The system of claim 13, wherein the web application is a packaged web application that may be executed locally on a computing device without access to a network.

* * * * *